United States Patent
Blatti et al.

[19]

[11] Patent Number: 6,000,623
[45] Date of Patent: Dec. 14, 1999

[54] SYSTEM PACKAGING FOR HIGH PERFORMANCE COMPUTER APPLICATIONS

[75] Inventors: Kenneth George Blatti; Mark Garrison Clark; Todd Douglas Green; Sukhvinder Singh Kang, all of Rochester; David George Lund, Byron; Christopher William Mann; Stephen Peter Mroz, both of Rochester, all of Minn.

[73] Assignee: International Business Machines Corporation, Armonk, N.Y.

[21] Appl. No.: 09/007,496

[22] Filed: Jan. 15, 1998

[51] Int. Cl.⁶ .................................................. F24F 7/00
[52] U.S. Cl. ................. 236/49.3; 62/259.2; 165/80.3; 361/695; 454/184
[58] Field of Search .................. 454/184; 236/49.5; 165/80.3; 62/259.2; 361/690, 695, 696, 697, 417.3

[56] References Cited

U.S. PATENT DOCUMENTS

| | | | |
|---|---|---|---|
| 4,756,473 | 7/1988 | Takemae et al. | 236/49 |
| 4,767,262 | 8/1988 | Simon | 415/119 |
| 5,493,474 | 2/1996 | Schkrohowsky et al. | 361/695 |
| 5,540,548 | 7/1996 | Eberhardt et al. | 415/182.1 |
| 5,745,041 | 4/1998 | Moss | 340/635 |
| 5,787,971 | 8/1998 | Dodson | 165/121 |

*Primary Examiner*—Henry Bennett
*Assistant Examiner*—Marc Norman
*Attorney, Agent, or Firm*—Matthew J. Bussan; Robert W. Lahtinen

[57] ABSTRACT

A cooling system for a host device affords enhanced reliability using multiple blower units mounted in parallel between a low pressure plenum and a high pressure plenum and a control system that senses when a blower unit is failing or has failed and responds by shutting down the failed unit and increasing the speed of the remaining blowers to maintain the air flow volume delivered to the cooling path. To maintain the integrity of the cooling air path while affording continuous operation of the host device, a spring biased closure door seals the access opening through which the blower is mounted when a blower unit is removed and displaced by the blower unit to an inoperative position against the biasing force of the spring when the blower unit is installed or replaced. To prevent recirculation through a vacated blower unit mounting space, a one way air flow device, in the form of a shutter assembly including plural pivoting louvers or vanes is mounted at the exhaust location of each blower. Thus the cooling air delivery is maintained and a blower unit can be removed for maintenance or replacement without interruption or impairment of host device operation.

9 Claims, 4 Drawing Sheets

SYSTEM PACKAGING FOR HIGH PERFORMANCE COMPUTER APPLICATIONS

FIELD OF THE INVENTION

The present invention relates to electronic systems and more particularly to the thermal cooling of such systems which employ multiple air circulating units.

BACKGROUND OF THE INVENTION

Electrical components have achieved high reliability that enable using systems to attain high standards of reliability, availability and serviceability. To attain the optimum reliability of which the electrical components are capable, it is necessary to have the more simple, low tech elements of the system also perform with maximum reliability. Among such elements that can malfunction and cause an electronically functional system to fail are connectors that separate or otherwise interrupt circuit connections and thermal cooling systems that may only partially fail, causing system shutdown to prevent system damage or erroneous system operation.

It is undesirable to have a system shutdown if an air circulating component fails or must be removed for service. Thus the cooling apparatus associated with a data processing system should tolerate a partial failure and subsequent removal and replacement of components without interrupting operation or causing a diminished performance of the data processing system. The system must correct for a failed cooling apparatus unit or element without operator or service intervention and must continue uninterrupted functioning when an element of the cooling system is removed for repair or replacement. The control of the cooling apparatus should not only continue operation while tolerating partial failure, but also determine when the apparatus is no longer capable of adequate performance and initiate an orderly shut down prior to compromise of the host system.

SUMMARY OF THE INVENTION

Within a data processing system, cooling of the components is accomplished by air flow that follows a generally top to bottom path using a multiple blower assembly. The multiple air circulating units such as blowers are mounted in parallel between a low pressure plenum and a high pressure plenum. The low pressure plenum connects to the outlet of the air path through the electronic components and the high pressure plenum communicates with the air flow path through the power supply elements to induce the continuous air flow from the cooling air inlets to the electronic component area to the outlet openings from the power supply compartment.

The blower system operates using a control system which maintains substantially constant air flow, whereby, if a single blower fails, the remaining blower speeds increase such that volume of air flow through the cooling path remains substantially the same. In addition the blowers are maintainable without computer system interruption, allowing replacement without shutting the system down. To allow any three blowers of a four blower system to operate effectively in a failed blower condition, all blowers must be connected in parallel between a low pressure plenum chamber and a high pressure plenum chamber. This allows the air flow needs provided by the failed blower to be met by the increased flow of the remaining three operating blowers. To manage the airflow following a blower failure, consideration must be given to inhibit recirculation through the failed blower site during absence of a blower which is undergoing maintenance and replacement procedures. To accomplish this, a gravity actuated shutter assembly, including a series of lovers each pivoted about a horizontal axis, is placed at the blower site outlet location and a spring loaded door is placed at the blower unit exit opening, such that when blower failure occurs and the blower is removed, the shutter closes and the door closes to prevent air recirculation therethrough. Thus the air flow is controlled to remain substantially constant whether blower failure occurs or a blower is removed pursuant to maintenance procedures. When a blower failure occurs and it is determined that the blower system already has a failed blower that has not been replaced in a system that can not tolerate the loss of more than a single unit, a shut down of the blower system is initiated. Thus, although the system is fault tolerant, it is important that timely maintenance occur to assure continuous, uninterrupted operation.

DETAILED DESCRIPTION

Figure 1:
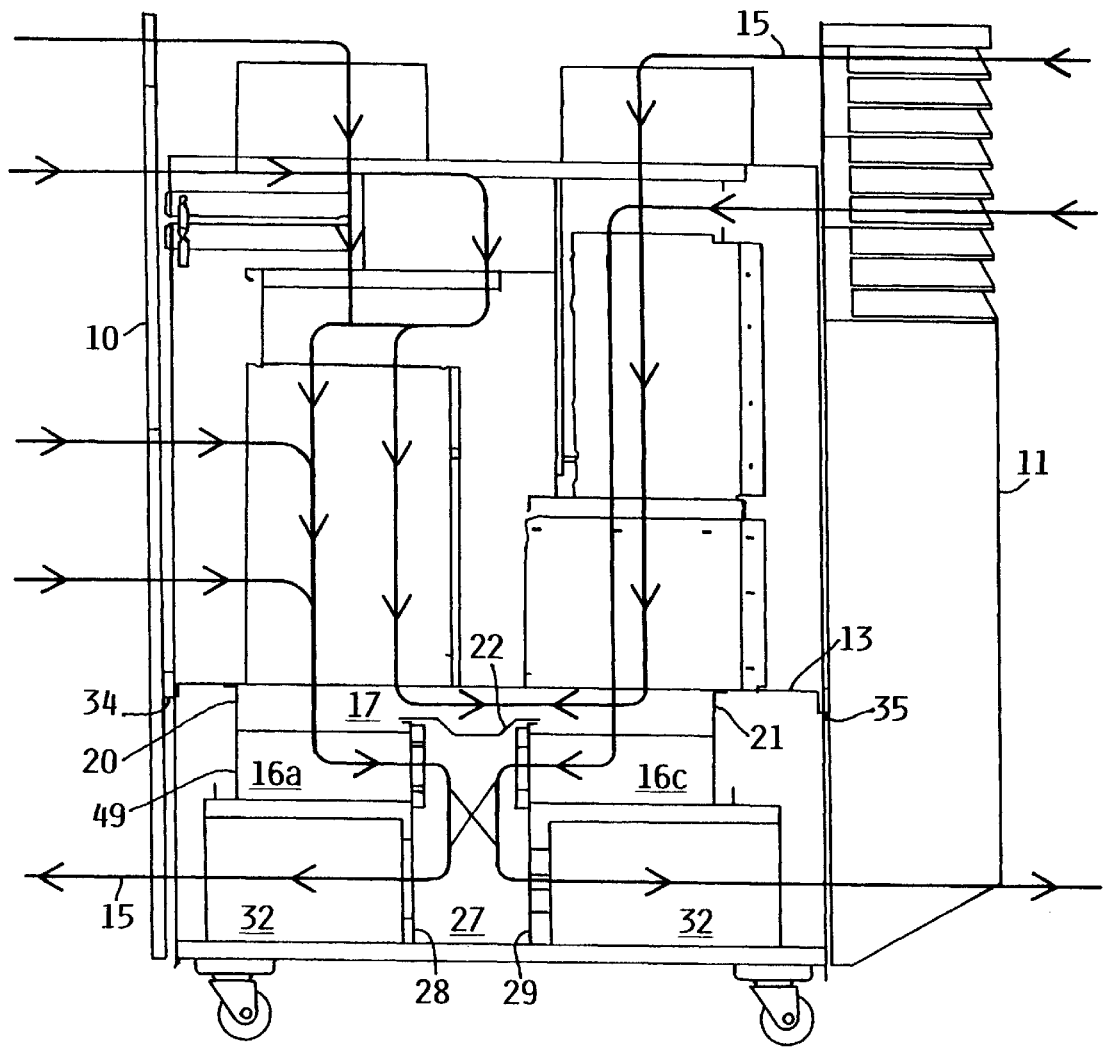
FIG. 1 is a side elevation of a typical mini computer system, incorporating the present invention, wherein the top and side panels of the enclosure have been removed and the air flow paths indicated.

FIG. 1 shows a typical computer data processing system enclosed within a housing including a front cover 10 and a rear cover 11 with the top and side portions of the enclosure removed to enable illustration of the cooling air flow path. The side walls, top and bottom of the enclosure are imperforate and do not function as a part of the cooling air circulation system, other than to confine the air paths and require all ingress and egress of the circulating air to occur through the front cover 10 and rear cover 11. The enclosure upper portion above the deck 13 supports the principal components of the data processing system mounted on circuit boards and the various peripheral components, such as disk drives, flexible disk drives, tape drives and optical disk drives used for data entry, data retention and data backup.

Figure 2:
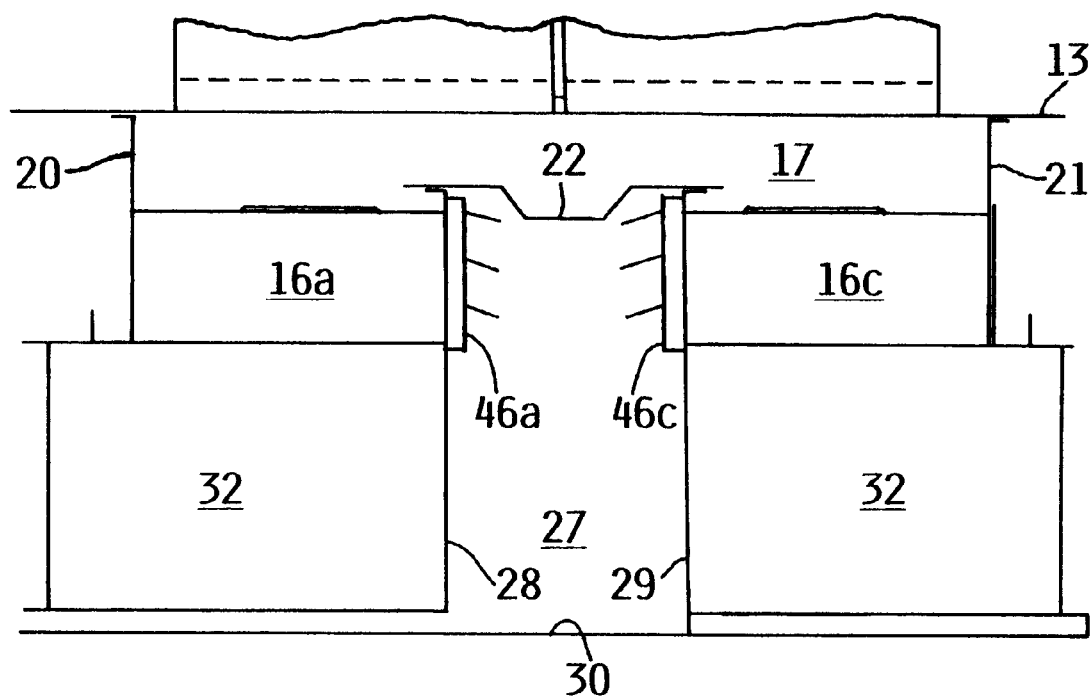
FIG. 2 is a partial side elevation of the device of FIG. 1, showing the low and high pressure plenum chambers and blower assemblies.

The enclosure defines an air flow path for cooling the system components as shown by the lines 15 identifying the path of the induced air flow. Air enters the upper portion of the enclosure through a plurality of openings in both front cover 10 and rear cover 11 at various elevations above the deck 13 and is directed over the principal processor and peripheral components and exits to a common low pressure plenum chamber (also shown in FIG. 2) through openings in deck 13. The low pressure plenum chamber 17 is defined by the deck 13; wall portions 20, 21, and 22; and the inlet or suction sides of the multiple blowers 16a, 16b, 16c, and 16d. The multiple blowers 16a through 16d receive air from the low pressure plenum 17 and exhaust to the high pressure plenum chamber 27; defined by the wall portions 22, 28, and 29 and the enclosure bottom wall 30. Openings in wall portions 28 and 29 enable air to be exhausted through the power supply apparatus 32 resident in the lower portion of the enclosure. The enclosure includes partitions that support the components and restrict air flow to define the air paths as shown by the directional lines 15. This includes air barriers such as the front cover barrier 34 and the rear cover barrier 35 which cooperates with the deck 13 to inhibit recirculation.

Figure 3:
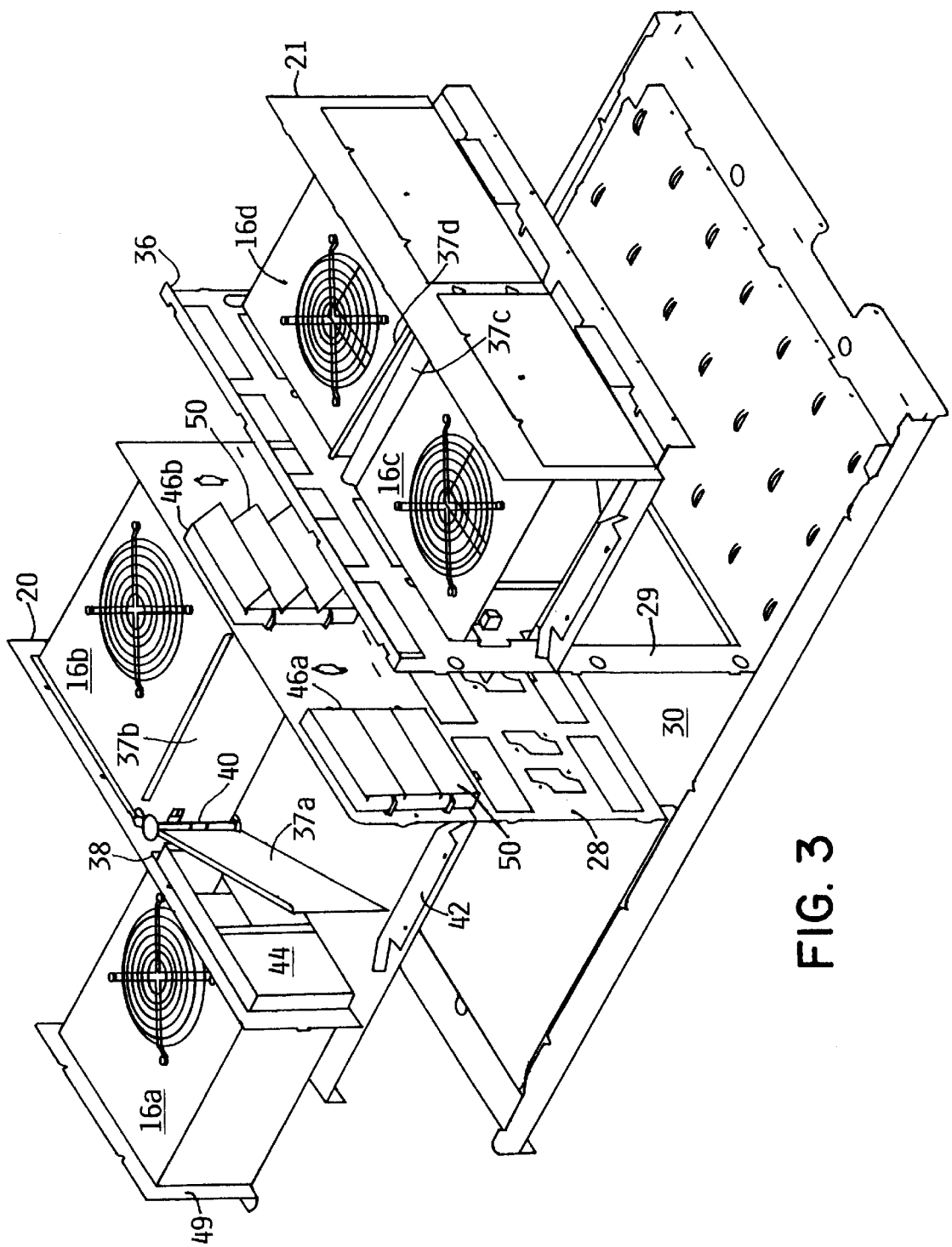
FIG. 3 is an enlarged perspective view of the multiple blower assembly of FIG. 1 showing details of the blower unit mounting.

FIG. 3 shows the multiple blower assembly which includes four blower units 16a, 16b, 16c, and 16d which are individually mounted and individually removable. In this figure, the upper portions of the wall elements 20 and 21 have been broken away, as has the flange on wall 28 which corresponds to the flange 36 on wall 29. Blower unit 16a is illustrated in a partially removed position. Each blower unit position respectively includes a spring loaded door 37a through 37d that closes the corresponding access opening 38 in the wall portion 20 or 21 when the blower unit has been removed. Installation of the blower unit 16a through the opening 38 displaces the door 37a against the biasing force of spring 40. The spring biased door 37a urges the blower unit 16a against the guide rail 42 as the blower is inserted to the fully installed position at which the blower outlet 44 is aligned at the rear of the shutter assembly 46a and the flanged rear plate 49 closes the access opening 38. The shutter assemblies each include three vanes or louvers 50 connected near the top to the surrounding frame to permit pivoting about a horizontal axis into the high pressure plenum when the associated blower is operating to deliver air (as shown by 46b) and closed to seal the opening (as shown by 46a) when the blower is removed or otherwise inactive, to prevent air recirculation.

When a blower such as 16a fails, the parallel mounting of the blower units enables the cooling air flow to be maintained by increasing the speed of the remaining blower units. During continuous operation of the data processing system, the failed or failing blower unit may be removed for service or replacement. When the blower unit 16a is removed, the door 37a, biased by spring, closes to seal the access opening 38 and maintain the integrity of the air path. Insertion of a blower unit through access opening 38 displaces door 37a to its inoperative position. Further, during the absence of a blower unit from the mounting site, the associated shutter assembly 46a closes to prevent air recirculation within the cooling path. This cooling air apparatus and control system enables continuous, uninterrupted operation so that the data processing system reliability is not compromised by the failure of an auxiliary support system.

Figure 4:
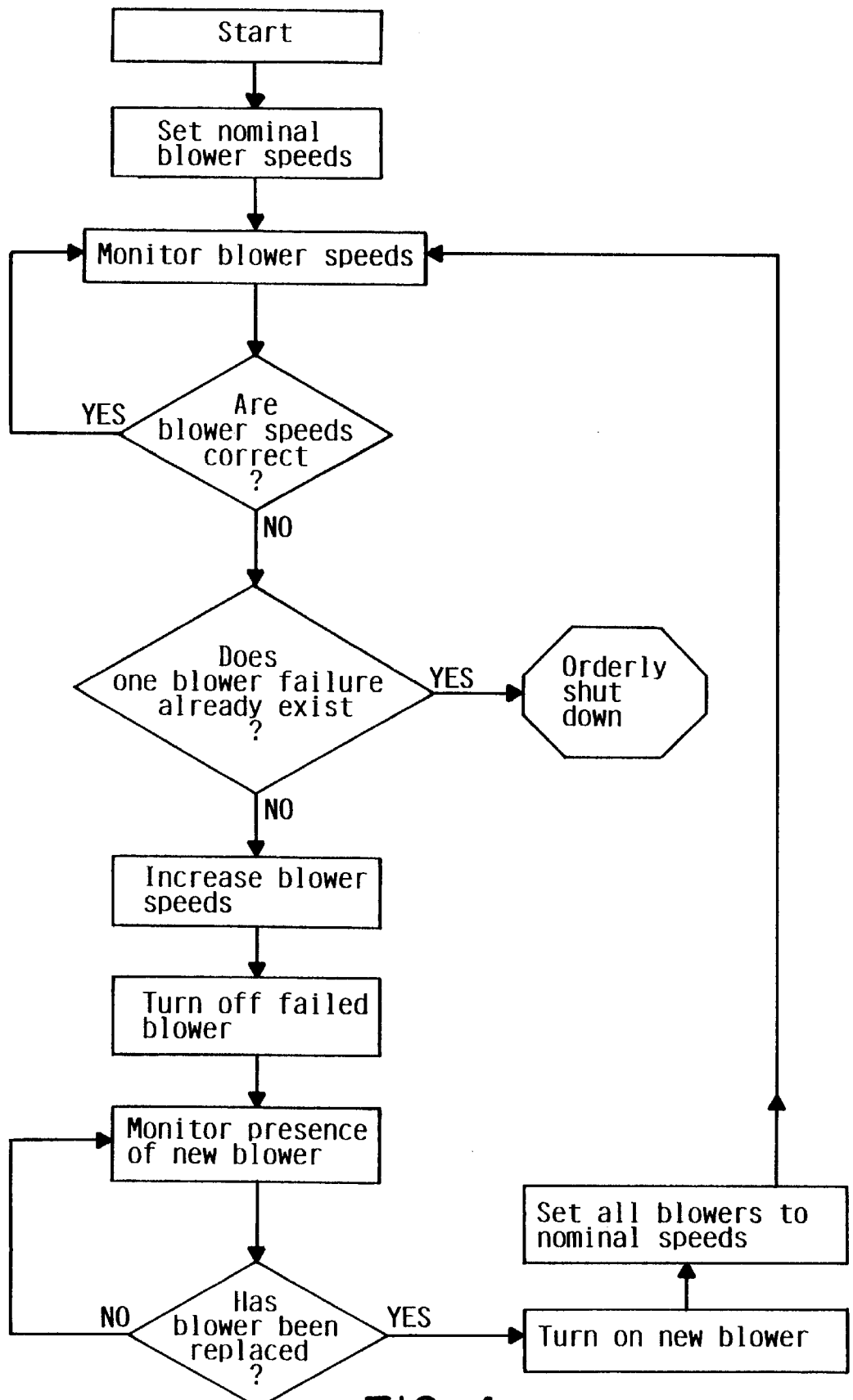
FIG. 4 is a flow diagram of the blower control system that provides for continuous, consistent cooling air flow when a blower unit has failed.

FIG. 4 shows the sequence of cooling system control that enables continuous operation of the computer system even in the presence of a blower failure or blower removal for repair or replacement. At system start up, each of the blowers is set at the nominal velocity to establish the design cooling air velocity through the device air path. During operation, the blower speeds are continuously monitored to determine whether any of the units is operating at a speed outside an established deviation from the nominal or established speed that would indicate a blower failure. If a failing blower unit is identified, there is an initial system examination to determine that there is not a prior blower failure for which operational speed compensation is presently in effect. This results from a design condition wherein the absence of a single blower of the four blower system can be tolerated and accommodated by speed adjustment of the remaining blowers, but a dual failure requires system shutdown. If there is a single blower failure, the speeds of the remaining three blowers are increased to compensate for the loss of output from the failed or failing unit and the failing unit is shut down.

When operating with one of the blower units shut down, the system uses a continuous monitoring loop to sense whether the failed blower has been replaced. Concurrently, the new established, higher speeds are continuously monitored to assure continued adequate cooling air delivery from the blower assembly. When there has been a replacement of the failed blower unit, the controller turns on the replacement blower and resets all blowers to the nominal speed and continues to monitor the blower speeds for a deviation from the reset nominal speeds. Regular maintenance should accompany the use of this fault tolerant system to assure uninterrupted computer system operation. As with multiple drive data storage systems, wherein error correction techniques can restore data lost by the failure of a single drive, the ability to tolerate the failure of a portion of the system must not be exceeded if the goal of fault free, continuous operation is to be achieved. The failing blower unit should be promptly replaced rather than relying on the system capability to function using fewer than all its components.

It will be appreciated that the structure of FIG. 1 represents but one embodiment of the multiple blower system. The blowers must be operating in parallel between common air spaces. The high pressure and low pressure plenum chambers shown are a convenient and utilitarian mode of practicing the invention in which the blower system is disposed between the power supply and electronic data processing, data storage and input/output components of the system to also assist in isolating these portions of the system from one another. However, the blower system could be disposed at any position in the air flow path including having the system provide a single source for cooling air entering the various air paths, which would replace the low pressure plenum or positioning the system to exhaust air from the computer system enclosure through the blower assembly outlet, eliminating the high pressure plenum. Similarly, the control system could be modified to tolerate more than a single simultaneous blower unit failure if the blower system can accept the increased load on the remaining blower units without reduced performance or material reduction of the life of the operational blowers. In addition, the control system could be expanded to adjust blower nominal speeds in response to variations in the ambient temperature that would affect the effectiveness of the cooling system.

What is claimed is:

1. A data processing system including an enclosure, apparatus for circulating cooling air through the system comprising a low pressure plenum connected by cooling air paths to the inlet openings to said enclosure;

a high pressure plenum connected by cooling air paths to the exhaust openings from said enclosure;

multiple blower units connected in parallel between said low pressure plenum and said high pressure plenum, each blower unit being mounted through an access opening in said enclosure; and a spring biased door which is biased to close and seal said access opening when the blower unit is removed and is displaced by the blower unit when such blower unit is installed through said access opening, whereby air path integrity is maintained when the blower unit is removed.

2. The data processing system of claim 1 further comprising one way air flow restricting means, associated with each said blower unit, mounted on a wall portion within said enclosure, and positioned at the outlet to the high pressure plenum, permitting air delivery to said high pressure plenum, but restricting flow therethrough out of said high pressure plenum when the associated blower unit is removed from said enclosure.

3. The data processing system of claim 2 further comprising control means for monitoring the speed of each blower unit and increasing the speed of the remaining blowers to maintain air delivery when a blower is found to have failed or is removed from the enclosure.

4. A data processing system within an enclosure having an electrical component cooled by a flow of air over the component, comprising a plurality of blowers which induce said flow of air over the electrical component, said plurality of blowers each having their suction sides connected to a common low pressure air space between the electrical component and said plurality of blowers, and operating at a predetermined nominal speed to induce said air flow;

controller means for increasing the speed of at least one of said plurality of blowers above said predetermined nominal speed when another of said plurality of blowers fails; and means for restricting air flow through a blower that has failed, wherein each of said plurality of blowers is part of a blower assembly which is inserted through an access opening in said enclosure which is closed by a portion of said blower assembly and said data processing system further includes a plurality of spring biased door members respectively adjoining each said access opening which are urged to an open position when the associated blower assembly is inserted through said access opening and is biased to close and seal the access opening when the associated blower assembly is removed through the access opening, whereby air path integrity is maintained when the blower unit is removed.

5. The data processing system of claim 4 further comprising a one way air flow device adjacent the outlet of each blower, installed within said enclosure, which allows air to freely discharge from the blower, but restricts the reverse air flow when the blower is inoperative.

6. The data processing system of claim 5 wherein said one way air flow device comprises a plurality of shutter assemblies with pivoted louvers carried by wall portions within said enclosure and respectively aligned and abutting the blower outlets when said blower assemblies are mounted within said enclosure.

7. The method of controlling a cooling system in a device wherein a cooling air flow is generated by multiple air circulating units connected in parallel, comprising the steps of setting the speeds of said air circulating units at a nominal value to effect a predetermined air delivery;

monitoring said air circulating units to determine whether an air circulating unit has failed;

increasing the speed of the remaining air circulating units when one of said air circulating units is found to have failed, whereby said predetermined air delivery is maintained;

turning off a failed air circulating unit; and monitoring the site of a failed and turned off air circulating unit for the presence of a replacement air circulating unit.

8. The method of controlling a cooling system of claim 7 further comprising the steps of turning on the replacement air circulating unit and resetting the air circulating unit speeds to maintain said predetermined air flow.

9. The method of controlling a cooling system of claim 8 further comprising the steps of determining whether an air circulating unit failure already exists when the step of monitoring the air circulating units determines that a unit has failed and invoking a shut down of the air circulating system when it is determined that the system has more than one current air circulating unit failure.

* * * * *